UNITED STATES PATENT OFFICE 2,457,227

STABILIZATION OF FATS AND OILS

Myers F. Gribbins, Wilmington, Del., assignor to E. I. du Pont de Nemours & Company, Wilmington, Del., a corporation of Delaware No Drawing. Application December 27, 1945, Serial No. 637,499

7 Claims. (Cl. 99—163)

This invention relates to the stabilization of edible animal, vegetable or fish oils, fats or waxes and more particularly to the stabilization of such substances that contain metals, by the use of a 3-substituted mercaptopropionic acid or a combination of such an acid and an ester thereof.

It is well known that vegetable, animal and fish oils, fats and waxes tend to become rancid and discolor after storage. Such deterioration is highly objectionable as it renders the fats, oils and waxes unfit for many uses. Agents have been proposed for inhibiting the rancidity and especially effective inhibitors are described for this purpose in the U. S. Patent of D. K. O'Leary, 2,397,976, filed July 19, 1942, and of M. F. Gribbins et al., 2,397,960, filed August 28, 1944.

While the inhibitors described in the aforesaid applications and other inhibitors used for retarding rancidity were by and large effective, it was found that the said oils, fats, and waxes did not invariably respond to treatment. Whether the failure of response to treatment with inhibiting agents was due to the agents themselves or due to contaminants present in the oils, fats or waxes, was not known and the failure of the inhibitors was most surprising particularly in those instances in which the substances treated appeared to be substantially free from contaminants.

An object of the present invention is to provide an improved process for inhibiting the rancidity of animal, vegetable, or fish oils, fats and waxes. Another object is to provide a process for removing metals from oils, fats or waxes. Yet another object is to provide a process whereby oils, fats and waxes containing metals are treated for the removal of the metals and subsequently fortified against rancidity by the incorporation of a 3-alkyl mercaptopropionic acid and/or substitution products thereof. Other objects and advantages of the invention will hereinafter appear.

It has been found that the occasional failure of inhibiting agents to protect edible animal, vegetable or fish oils, fats and waxes is due to the presence of minute quantities of metals. These metals are derived from various sources, for example, from the catalysts employed in the hydrogenation of fats, from corrosion of containers in which the fats are processed or stored or from any other source which results in contamination by metals, their oxides or salts. Moreover, it has been found that when these metals are present in small amounts, copper, iron and nickel in amounts ranging respectively from 0.1 to 2; 2.0 to 30 and 0.5 to 15 parts per million, they not only accelerate deterioration but also in many instances wholly destroy the inhibiting action of the agents added to effect stability. These findings made it necessary to devise a method for removing the metals.

After considerable investigational work it was found that the metals could be removed by incorporating into the fat a suitable amount of an acid or ester having the structural group

ROOCCH$_2$CH$_2$S—X in which R is hydrogen or a hydrocarbon group and X is a hydrocarbon, an oxygenated-, sulfur-, sulfur- and oxygenated-, and sulfur- and nitrogen-hydrocarbon. Examples of such acids and esters are specifically described in the M. F. Gribbins et al. patent and include such compounds as 3-methyl mercaptopropionic acid; 3-hydroxymethyl mercaptopropionic acid; 3-mercaptoethyl mercaptopropionic acid; 3-carboxyethyl mercaptopropionic acid; 4,7-dithiosebacic acid; 3-benzothiazyl mercaptopropionic acid and equivalent acids and their esters.

The treatment consists in adding an amount of the aforesaid compound sufficient to remove the metal present and usually about 0.001 to 0.50% of the acid based on the weight of oil, fat or wax is sufficient. The mixture is stirred for from 1 to 5 hours preferably at a temperature of about 50 to 100° C. After this treatment which may result in salt formation between the acid and the metal present, chelate ring formation or coagulation of the colloidally dispersed metal, the thus treated mixture is filtered for the removal of the metal. Thereafter the specified amount of a rancidity inhibiting agent, preferably an ester of an aforementioned acid, is added and it will be found that these agents will then have their normal ability to inhibit rancidity. While the above theoretical explanation with respect to the modus operandi is offered to explain the possible reaction or reactions that take place; however, the invention is not limited to such a theory of operation for, no matter what occurs when the acids or esters are added, the metal is removable by subsequent filtration.

The influence of metals such as nickel was discovered during the treatment of lard with lard flakes. (Lard flake is hydrogenated lard which has a higher melting point than lard and is added to lard to improve its melting characteristics.) It was found that the lard could be treated to improve its stability but when lard flakes were incorporated with the lard the addition of a stabilizing agent had little or no influence on the stability of the mixture. Table I illustrates the influence of the addition of lard flakes to lard.

*Table I*

| | Fat | AOM Stability in hrs. | Nickel content of flakes in P. P. M. |
|---|---|---|---|
| 1 | Lard | 5 | |
| 2 | Lard plus flakes | 1 | 6.0 |
| 3 | do | 1 | 11.0 |
| 4 | Lard plus treated flakes (Nickel-free) | 5 | 0.5 |

The well-known Swift test (AOM) was used for evaluation of fat stability ("Oil and Soap," 10, 105-109 (1933) A. E. King "An Accelerated Stability Test Using the Peroxide Value as an Index"). The blends were made by mixing 88 parts by weight of lard with 12 parts by weight of lard flakes and it is evident from this table that when flakes were blended with lard the mixture was unstable. The higher the AOM (AOM=hours required for rancidification under test conditions) value the more stable the lard. Lard and lard plus substantially nickel-free flakes, tests 1 and 4, have substantially the same stability (fractional hours not recorded). While lard plus flakes containing 6 or better P. P. M. of nickel, tests 2 and 3, are considerably less stable.

In the runs illustrated in Table II the inhibiting agent and lard flakes were heated at 90° C. for 1 to 6 hours with constant stirring and the thus treated mixture filtered to remove the metal precipitated by this treatment and the resultant metal-free lard flaked. These flakes were then blended with lard and Swift tests run as before. The stability reduction factor was determined as in Table I, 88-12 blends of lard and lard flakes were used, the lard having a 5-hour stability.

*Table II*

| | Treatment of Flakes | AOM Stability in hrs. |
|---|---|---|
| 1 | None | 1 |
| 2 | Heated 2 hrs. and filtered | 1 |
| 3 | TDP acid [1] 0.02%, heated 1 hour | 5½ |
| 4 | TDP acid 0.02%, heated 2 hours | 6 |
| 5 | TDP acid 0.02%, heated 4 hours | 6 |
| 6 | TDP acid 0.02%, heated 6 hours | 5 |
| 7 | TDP acid 0.02% plus dilauryl TDP 0.05%, heated 1 hour | 9 |
| 8 | TDP acid 0.02% plus dilauryl TDP 0.05%, heated 6 hrs | 8 |
| 9 | TDP acid 0.02% plus dilauryl TDP 0.42%, heated 2 hrs | 40 |
| 10 | "Dilauryl" TDP 0.05%, heated 2 hours | 2 |

[1] TDP Acid—Thiodipropionic acid.

It is evident from the study of Table II that the addition of TDP acid removes substantially all of the nickel or other metal from the lard that affects its stability as is indicated by the stability of runs 3 to 6 inclusive. When lard flakes are treated with combinations of TDP acid and its fat soluble dilauryl ester, as in runs 7, 8, and 9, the ester is not removed in the filtration step and its normal stabilizing ability is evident by the increase in stability, to 9, 8, and 40 hours respectively for the blended lards prepared with these treated flakes.

In a commercial plant run treatment of lard flakes with 0.02 TDP acid for two hours duplicated the results indicated in Table II, run 4. Heating for 5 hours with 0.02 TDP was found to be unnecessary as it had a tendency to develop rancidity due to the high rate at which rancidity develops at high temperatures. TDP acid is not particularly soluble in hot lard and inasmuch as mutual solubility has a considerable influence on the rancidity inhibiting properties of an agent, the tendency to rancidity after extending heating would be expected. This can be avoided by employing with the TDP acid or its equivalent an oil-, fat-, or wax-soluble ester of the acid. Products so treated, it has been found, develop little rancidity during heating for the removal of the metal and as the ester is soluble and not removed by precipitation it is retained in the filtrate thereby effecting stability of the product.

The advantages resulting from the use of a mixture of TDP acid and esters were demonstrated by a plant run wherein from 0.01 to 0.02% TDP acid with from 0.05 to 0.30% TDP dilauryl ester was added to a lard-lard flake blend containing approximately 3 P. P. M. nickel which had been used as a catalyst for hydrogenating lard to lard flake. The TDP acid was sufficient to tie up the metallic impurities of the fat (derived from lard flakes or metal equipment) while the TDP ester was used to impart to the lard and did impart thereto a high degree of stability which also was carried over into the products which were made from the thus treated lard.

By the incorporation therefore of both an acid and ester of TDP or of one of the other rancidity inhibiting agents described above a product is obtained from which the metal can be separated and a stabilized product produced. This same desirable end can be reached by introducing an excess of the acid over and above that necessary to react stoichiometrically with or to remove the metal present, say in the order of 0.05-0.50% based on the weight of an oil, fat or wax, containing not more than about 25 P. P. M. of a metal. A portion of the acid is consumed and removed with the metal during filtration while a portion is retained to effect stability.

While the examples given deal principally with fatty substances containing nickel resulting from hydrogenation it has likewise been found that other metals limit the activity of the inhibiting agents. The metal contaminants may result from the corrosive action of the oils, fats and waxes during processing in apparatus fabricated from metals such, for example, as iron, copper, nickel and the like.

Table III demonstrates results obtained by treating a blended lard (88 parts lard, 12 parts lard flakes by weight) with the TDP acids and esters which was subsequently evaluated for stability by the AOM and pie crust methods. Pie crust evaluations were made by preparing batches of the crust with treated lards and storing at 50° C. Organoleptic observations for rancid odors were made.

*Table III*

| | Stability | |
|---|---|---|
| Treatment | AOM 99° C., Hrs. | Pie Crust 50° C., Days |
| None | 1 | 4 |
| TDP acid 0.01% | 25 | |
| TDP acid 0.01%+"dilauryl" TDP 0.05% | 35 | |
| TDP acid 0.01%+"dilauryl" TDP 0.10% | 70 | |
| TDP acid 0.02% | 36 | 5 |
| TDP acid 0.02%+"dilauryl" TDP 0.05% | 58 | 12 |
| TDP acid 0.02%+"dilauryl" TDP 0.10% | 84 | 14 |

Many fats are treated prior to use to remove offensive odors and this treatment is generally effected by what is called a steam purge operation conducted by injecting steam into the molten fat or oil at a temperature of about 190° C. and under low pressures in the order of 15 mm. or less. During this operation and because of the acidity of the fats, metals are dissolved in and contaminate the product. A further feature of this invention involves the addition of the stabilizing agent as acid and/or ester in sufficient amounts during the steam purge operation in order to precipitate the metals which may be picked up during this operation. Moreover, it has been found that when the inhibitors are present during the operation there is less metal actually dissolved by the fat. Table IV illustrates the effectiveness of this type of treatment.

Table IV

| Run | Treatment | | Stability AOM, Hrs. |
|---|---|---|---|
| | Prior to Deodorization | Subsequent to Deodorization | |
| 1 | None | None | 4 |
| 2 | Dilauryl TDP 0.05% | do | 5 |
| 3 | Dilauryl TDP 0.10% | do | 10 |
| 4 | TDP acid 0.01% | Dilauryl TDP 0.10% | 130 |
| 5 | Do | None | 20 |
| 6 | Do | Dilauryl TDP 0.20% | 270 |
| 7 | Do | Dilauryl TDP 0.30% | 500 |

While the comparisons illustrate principally the use of thiodipropionates and esters thereof, the other rancidity inhibiting agents referred to in the aforesaid patent applications of O'Leary and Gribbins et al. may be used generally in about the same proportions. It will be appreciated by those skilled in the art that by a simple comparison on a weight basis, and a determination of the AOM values, the effectiveness of a given antioxidant can be established with substantially mathematical precision so that the proportions to be used for optimum results can be readily determined for any inhibitor or mixture thereof.

I claim:

1. In a process for inhibiting the rancidity of a member of the group consisting of edible vegetable, animal and fish oils, fats and waxes, containing metals, the step which comprises heating the compound of the group with a beta-mercaptopropionic compound having the linear structural formula $ROOCCH_2CH_2S-X$ in which R is selected from the group consisting of hydrogen, and hydrocarbon groups and in which the monovalent substituent X is a member of the group consisting of hydrocarbons, oxygenated-, sulfur-, sulfur- and oxygenated-, and sulfur- and nitrogen-hydrocarbons and thereafter separating the precipitated metal.

2. The process of claim 1 in which the beta-mercaptopropionic compound is thiodipropionic acid.

3. The process of claim 1 in which the beta-mercaptopropionic compounds are thiodipropionic acid and fat soluble esters thereof.

4. In a process for protecting against rancidity a member of the group consisting of a member of the edible vegetable, animal and fish oils, fats and waxes containing metals, the steps which comprise removing the metal by heating with a beta-mercaptopropionic compound having the linear structural formula $ROOCCH_2CH_2S-X$ in which R is selected from the group consisting of hydrogen, and hydrocarbon groups and in which the monovalent substituent X is a member of the group consisting of hydrocarbons, oxygenated-, sulfur-, sulfur- and oxygenated-, and sulfur- and nitrogen-hydrocarbons filtering to remove the metal and thereafter inhibiting the rancidity of the substance from the group by incorporating therein a beta-mercaptopropionic compound of the group.

5. In a process for inhibiting the rancidity of a member of the group consisting of edible vegetable, animal and fish oils, fats and waxes containing metals, the step which comprises heating the compound of the group with a mixture of thiodipropionic acid and the dilauryl ester thereof and thereafter separating the precipitated metal by filtration.

6. In a process for inhibiting the rancidity of a mixture of lard and lard flake the step which comprises heating the mixture with a beta-mercaptopropionic compound having the linear structural formula $ROOCCH_2CH_2S-X$ in which R is selected from the group consisting of hydrogen, and hydrocarbon groups and in which the monovalent substituent X is a member of the group consisting of hydrocarbons, oxygenated-, sulfur-, sulfur- and oxygenated-, and sulfur- and nitrogen-hydrocarbons and thereafter separating the precipitated metal.

7. In a process for inhibiting the rancidity of a mixture of lard and lard flake containing a metal contaminate the step which comprises heating the mixture with beta-mercaptopropionic acid and the dilauryl ester thereof and separating from the lard and lard flake the metal as a precipitate.

MYERS F. GRIBBINS.

REFERENCES CITED

The following references are of record in the file of this patent:

UNITED STATES PATENTS

| Number | Name | Date |
|---|---|---|
| 2,397,960 | Gribbins et al. | Apr. 9, 1946 |
| 2,397,976 | O'Leary | Apr. 9, 1946 |
| 2,407,616 | Phelps et al. | Sept. 10, 1946 |